March 9, 1965 E. H. YONKERS Re. 25,739

SECONDARY LIGHTNING ARRESTER

Original Filed July 29, 1959

INVENTOR.
EDWARD H. YONKERS
BY
Mason, Kolehmainen, Rathburn and Wyss
Attorneys.

United States Patent Office

Re. 25,739
Reissued Mar. 9, 1965

25,739
SECONDARY LIGHTNING ARRESTER

Edward H. Yonkers, Glencoe, Ill., assignor to Joslyn Mfg. and Supply Co., Chicago, Ill., a corporation of Illinois Original No. 2,987,642, dated June 6, 1961, Ser. No. 830,233, July 29, 1959. Application for reissue Apr. 16, 1962, Ser. No. 189,950
22 Claims. (Cl. 313—231)

Matter enclosed in heavy brackets [ ] appears in the original patent but forms no part of this reissue specification; matter printed in italics indicates the additions made by reissue.

The present invention relates generally to a lightning arrester and is more particularly concerned with a new and improved protective device generally known as a secondary lightning arrester for use on secondary or low voltage circuits. More specifically, the invention is devoted to improvements in lightning arresters of the type disclosed in United States Patents Nos. 2,628,322 and 2,670,452 which are assigned to the same assignee as the present invention.

Secondary lightning arresters are used to protect equipment connected to the low voltage or secondary circuits in power distribution systems which usually have their primary or high voltage circuits also protected by lightning arresters or similar devices. The present invention is concerned with the protection of the secondary circuits of the system and, more particularly, with the protection of delicate electrical instruments and equipment which cannot be adequately protected by secondary arresters of prior design for several reasons. Among these reasons are the size or bulk of prior secondary arresters which inhibit their installation in the very small space generally available in the instruments to be protected; the high cost of manufacture; the excessive gas blast and the direction of this blast into areas of the instrument where it will damage component elements; the high impulse level which results in inadequate protection at low voltages; the excessive follow current drawn which may result in smoking up the interior of the instrument and in damage to the instrument parts; and the fact that many of the prior secondary arresters are designed for use in multiple phase systems whereas the instruments to be protected by the arrester of the present invention are often used in single phase systems. The present invention, therefore has for a primary object the provision of a lightning arrester which avoids all of the aforementioned disadvantages of prior secondary arresters.

Another object of the present invention is to provide a new and improved protective device well suited for use on secondary circuits to protect delicate instruments which cannot be protected adequately by arresters of prior design.

A further object of the present invention is to provide an improved secondary arrester of simple construction so that it can be manufactured inexpensively but will, at the same time, afford adequate protection to secondary equipment to supplement the protection commonly provided on primary circuits.

The invention has for another object the provision of a secondary arrester having a minimum number of easily manufactured components which can be readily assembled in a manner providing accurately controlled protection of secondary instruments.

It is a further object of the present invention to provide a new and improved secondary arrester wherein the power follow current is limited to prevent the effects of this current from damaging either the apparatus being protected or the arrester itself.

It is another object of the present invention to provide a new and improved secondary arrester employing a minimum number of parts constructed and arranged to effect a low impulse level for protecting delicate instruments and devices which are connected to secondary distribution systems.

It is also an object of the present invention to provide a new and improved secondary arrester which will provide adequate protection for delicate instruments and devices operating in single phase distribution systems.

The foregoing and other objects are realized, in accordance with the present invention, by the provision of a secondary arrester or protective device small in size and employing a minimum number of parts which are capable of assembly in a simple and expeditious manner while, at the same time, affording adequate protection for delicate secondary equipment such as electrical instruments and the like. The secondary arrester comprises an outer conductive housing having a pair of gap forming electrodes accurately spaced apart to provide an arc discharge path between the housing and a conductor leading into this housing. The housing further contains a number of easily manufactured components molded from insulating material for the purpose of holding the gap defining electrodes in accurately spaced apart relationship. The gap is of the expulsion type and, to this end, a gas evolving element is disposed adjacent the discharge gap for the purpose of distributing the discharge arc uniformly around the circular gap thus preventing damage to the gap electrode. In accordance with an important feature of the present invention, the conductor leading into the housing is formed of a material having a very high positive temperature coefficient of resistance so that its resistance increases as a result of the passage of surge and power current, thereby to limit the magnitude of the power follow current. The length of this conductor is sufficient to provide the necessary increase in resistance for limiting the power follow current but is small enough initially to avoid the introduction of excessive IR voltage which would interfere with the protective function of the arrester.

The invention both as to its organization and manner of operation, together with further objects and advantages, will best be understood by reference to the following detailed description taken in conjunction with the accompanying drawing wherein.

Figure 1:
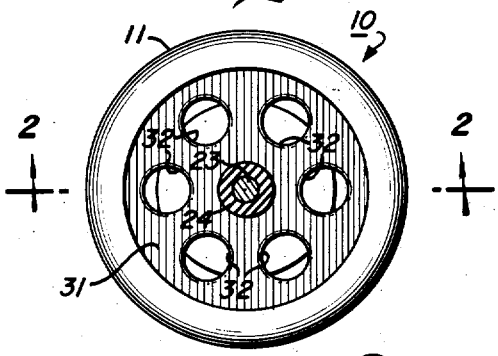
FIG. 1 is a top view illustrating a secondary lightning arrester characterized by the features of the present invention.
Figure 2:
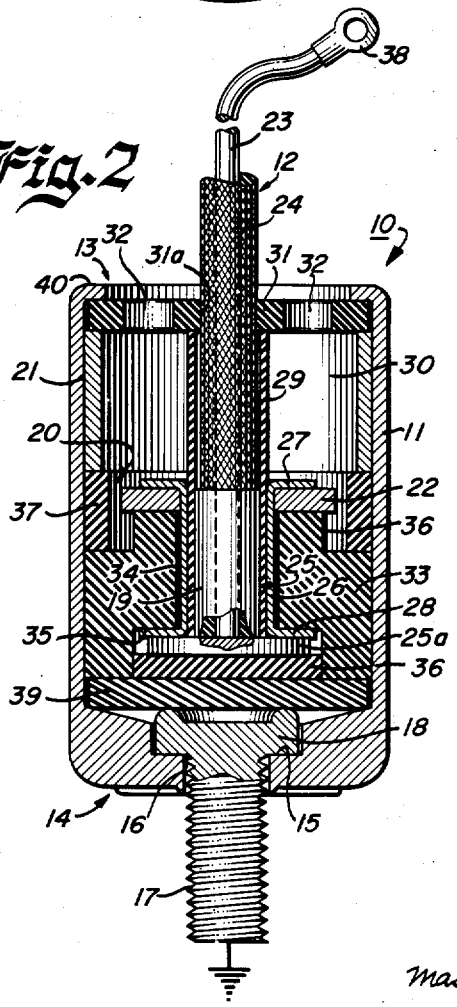
FIG. 2 is a sectional view taken along a line substantially corresponding to the line 2—2 in FIG. 1.

Referring now to the drawings and first to the form of the invention illustrated in FIGS. 1 and 2, the protective device of the present invention is there illustrated generally by the reference numeral 10 and comprises a conductive casing or housing 11 from which extends an insulated conductor 12 for making electrical connection with secondary equipment to be protected. The housing 11 may, of course, take a number of different forms but in the arrangement illustrated in FIGS. 1 and 2, it comprises a generally cylindrically shaped casing having one substantially open end indicated by the reference numeral 13 and a closed or lower end indicated by the reference numeral 14. The housing is preferably formed of a suitable conducting material such as an impact extruded aluminum with the closed end 14 being somewhat thicker than the main cylindrical body of the housing. The upper surface of the closed end 14 tapers downwardly to a hexagonally shaped, terminal receiving recess 15 opening to a bore 16 extending through the lower end 14. The latter bore accommodates the threaded shank of a terminal screw 17 which has its hexagonally shaped head portion 18 inserted within the recess 15 in order to prevent the terminal screw from turning. The lightning arrester 10 is adapted for use in 115 volt single phase power systems and, to this end, the 115 volt input terminals of the electrical instrument to be protected are respectively connected to the terminal screw 17 and to a terminal 38 suitably secured to the end of the conductor 12.

The arrester 10, of course, functions to provide a discharge path across the input terminals to bypass the instrument being protected whenever the applied voltage exceeds the impulse level of the arrestor. To this end, the component parts assembled within the housing 11 form an expulsion type air gap indicated generally by the reference numeral 20 which, as will be described more fully hereinafter, provides a discharge path from the conductor 12 to the terminal 17 for surge current resulting from an over-voltage or surge. The air gap 20 is defined between an outer sleeve-like electrode 21 and an inner ring-like electrode 22 with both of these electrodes being formed of a suitable conducting material such as copper. The outer electrode has an outer diameter approximately corresponding to the inner diameter of the housing 11 and, hence this electrode fits tightly against the housing to provide a good electrical connection. The inner electrode 22 on the other hand has an outer diameter considerably less than the inner diameter of the housing 11 and this electrode is positioned concentric with but spaced somewhat from the outer electrode 21 in order to define a uniform, annular discharge gap.

An electrical connection is made from the inner electrode 22 to the conductor 12 by a suitable connecting means, the construction of which will become evident as the description proceeds. More specifically, the insulated conductor 12 includes an inner conductor 23, which may be either of the single wire or the twisted strand type, surrounded by an insulating layer 24 such as an impregnated woven fabric. The inner end of the conductor 23 is suitably secured to a conducting terminal member 25 having a sleeve-like body portion formed integral with an enlarged head 25a. The terminal member may be secured to the inner end of the conductors by crimping the sleeve-like portion 19. The head 25a of the terminal member engages a conducting bushing 26 having annular flanges 27 and 28 extending outwardly from its opposed ends. The flange 28 seats against the head 25a to provide an electrical connection from the inner conductor 23 to the bushing 26. The upper flange 27 on the other hand seats against the inner electrode 22 to complete the electrical connection from the inner conductor 23 to the inner electrode. To this end, the central opening in the ring-like electrode 22 is approximately equal to the outer diameter of the body of the bushing 26, thus providing a relatively close fit between these parts. A heat resistant insulating sleeve 29 is placed over the lead wire 12 to protect its insulation from hot discharge gases during operation. The insulating tube 29 extends toward the open end 13 and the housing 11 and through a discharge chamber 30 defined within the housing. The later chamber is vented directly to atmosphere through a perforated disc 31 seated upon the upper end of the sleeve-like electrode 21 and the insulating tube 29. The disc 31 is provided with a central opening 31a for accommodating the conductor 12 and also includes a plurality of spaced apart vent openings 32 extending from the chamber 30 to atmosphere.

It is essential that the inner electrode 22 be accurately spaced from the outer electrode 21 so that the discharge gap will be both uniform and of predetermined length and, to this end, the inner electrode is held in position by a support member 33 accurately formed from a suitable insulating material such as Bakelite. The insulating member 33 is provided with a through axial opening 34 for accommodating the bushing 26, the lower portion of the insulating tube 29, the sleeve-like body portion 19 of the inner terminal 25 and the inner end of the insulated conductor 12. The through opening 34 opens to an enlarged cavity 35 formed in the lower end of the insulating member 33 for the purpose of accommodating the flange 28, the head 25a of the terminal member 25 and an insulating wafer 36 disposed immediately below the head 25a.

The insulating member 33 is also provided at its upper end with an annular peripheral recess 36 formed adjacent the air gap 20 for the purpose of receiving a ring 37 formed of horn fiber or other suitable gas evolving insulating material. The latter ring is interposed between the insulating member 33 and the outer electrode 21 and is concentric with but spaced from the inner electrode 22. The ring 37 has an outer diameter approximately equal to the inner diameter of the housing 11 and it serves to hold the outer electrode 21 above the inner electrode 22 to maintain the spacing of the discharge gap 20. When the discharge gap 20 sparks over in response to a surge or over-voltage condition existing between the conductor 12 and the terminal 17, the ring 37 is heated so that it evolves gas causing the arc to distribute around the circular gap 20 and to aid in extinguishing the arc when the over-voltage condition subsides. More specifically, any arc drawn between the outer electrode 21 and the inner electrode 22 comes into contact with the extreme upper edge of the gas evolving ring 37, thereby causing this ring to evolve gases to aid in extinguishing the arc drawn and to distribute this arc around the periphery of the electrode 22 and around the lower end of the electrode 21.

The width of the discharge gap 20, of course, determines the impulse level of the arrester and it may be adjusted to any desired value. However, the gap width should be large enough to prevent sparkover under normal operating conditions and small enough to sparkover when a predetermined over-voltage occurs. In many prior lightning arrester designs,, the length of this gap has been excessive and, as a result, the impulse level of the arrester has been much too high to provide adequate protection for delicate electrical instruments. In accordance with the present invention, it has been found possible to reduce the width of the discharge gap to as little as .020 inch with the result that any 115 volt alternating current instrument or appliance having an impulse level equivalent to .020 inch of air gap or greater is afforded positive protection by the device 10. In accordance with the present invention, the use of an air gap of .020 inch produces an impulse level in the range from 1500 to 2000 volts.

In accordance with another important feature of the present invention, the insulated conductor 12 limits the follow current which flows during operation to safe levels both in respect to the arrester itself and the equipment under protection. To this end, the insulated conductor 12 includes an inner conductor 23 formed of a suitable material, preferably iron, having a very high positive temperature coefficient of resistance. At temperatures in the operating range of the instrument being protected, the conductor 23 has a resistance sufficiently low that it does not add significantly to the so-called IR drop of the arrester, but when high fault current is available from the power system at the point of application, the flow of follow current through the conductor 23 will cause its resistance to increase as much as five times the initial value by $I^2R$ heating. The value of resistance required to limit follow current to less than 1000 amperes on a 115 volt system is of the order of $\frac{1}{10}$ ohm so that the cold resistance is about $\frac{1}{50}$ of an ohm. Resistances of this order can be obtained from iron wire of various diameters and lengths. However, proper current limiting arrester function can only be achieved by careful design selecting the shortest lead length and smallest wire size that will not develop excessive heating and self-damage under the most severe conditions expected in the field.

Iron wire 6 inches long B & S gauge 16 meets the requirements for the 115 volt design. While the conductor 23 may be formed of a number of materials having a temperature coefficient of the type described above, iron is preferred because of its low cost and also because it exhibits the most desirable temperature characteristics. Thus, iron has a temperature coefficient of approximately .005 at 20 degrees centigrade and this temperature coefficient increases very sharply to .0147 at 500 degrees centigrade. At temperatures above 500 degrees centigrade, the temperature coefficient of iron decreases. Since the temperature of the conductor 23 may range between 20 and 500 degrees centigrade, a volume resistivity change from $10^{-5}$ to $48\times10^{5}$ ohm centimeters or an increase of about 500 percent may be experienced. This means that at normal operating temperatures, the conductor 23 provides very low initial resistance and, hence, the surge voltage or IR drop is very small. But the increase in resistance during operation is effective to limit the power follow current even though the secondary arrester 10 may be connected to a very large transformer or to a high fault current source. The use of the variable resistance conductor 23 permits the construction of a compact effective and economical secondary arrester that can be applied to any power circuit within its voltage rating no matter how high the available fault current may be.

Another important feature of the present invention resides in the simple manner in which the component elements of the arrester 10 may be assembled within the housing 11 and, at the same time, may be held in accurately spaced positions. More specifically, during assembly the lower terminal screw 17 is first inserted through the opening 16 until its head 18 is seated within the hexagonal recess 15. An insulating disc 39 is next inserted into the housing and is placed on top of the head of the terminal screw 17. An inner electrode subassembly comprising the insulating member 33, the bushing 26, the inner terminal 25, the wafer 36 and the inner electrode 22 is then inserted into the housing with the insulating member 33 seated on the disc 39. The fiber ring 37 is then dropped into the recess 36 whereupon the outer sleeve-like electrode 21 is inserted. The perforated plate 31 is then slipped over the conductor 12 and is placed on top of the electrode 21 and the tube 29. The assembly is then completed by crimping the upper end of the housing as indicated at 40, an operation which results in holding all of the assembled parts in position within the housing 11. All of the parts are accurately maintained in the desired position by the construction described. The inner electrode 22 is thus uniformly spaced from the lower end of the sleeve-like electrode 21 and from the fiber ring 37, thus insuring a uniform arc gap 20 around the entire periphery of the ring 22.

All of the parts can be manufactured very easily and inexpensively and, this fact, coupled with the minimum number of components employed results in a unit which can be fabricated by mass production methods at very low cost. The unit is very small since the casing 11 is only about 1 inch long and ⅝ inch in diameter and, as a consequence, it can be installed in any small space within the instrument to be protected. The unit is very light so that complicated mounting clamps or the like are not required.

Figure 3:
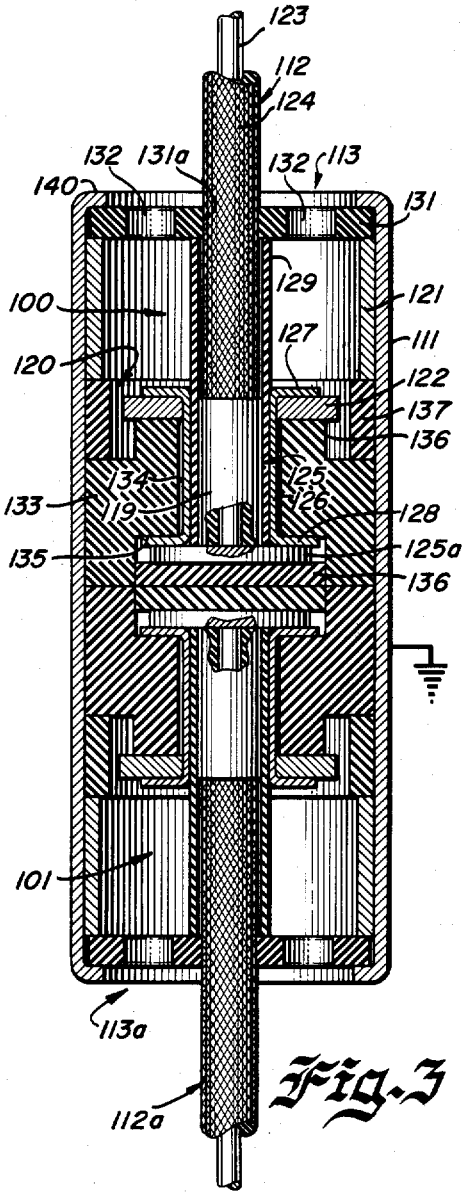
FIG. 3 is a sectional view somewhat similar to FIG. 2 but illustrating a second embodiment of the lightning arrester of the present invention.

In the form of the invention shown in FIG. 3, a double arrester is emplyed for 220 volt applications and for applications when neither side of the line is at ground or neutral. The arrester 110 shown in FIG. 3 actually comprises two arrester units 100 and 101 of the type shown in FIG. 2 and described above. Both of these units are assembled within a single elongated casing 111 having two substantially open ends 113 and 113a. Since the component elements of the two assemblies 100 and 101 are identical to the corresponding elements of the device 10 illustrated in FIGS. 1 and 2, corresponding reference numerals have been employed except that in the case of the form illustrated in FIG. 3, the reference numerals in the 100 series have been used. Thus, in the form of the invention shown in FIG. 3, the insulated conductor is indicated by the reference numeral 112, the perforated venting plate bears reference numeral 131, the inner electrode bears reference numeral 122, the outer electrode is designated by reference numeral 121 and so on. Thus, the arrester 110 illustrated in FIG. 3 may be used in ungrounded 220 volt systems by connecting the two insulated conductors 112 and 112a to the line conductors of the system. The arrester 110 may also be used in systems employing 220 volts with 110 volts on each side of the neutral providing an arrester for each side of such a 3 wire system.

In view of the detailed description above, the operation of both embodiments of the present invention will be readily understood by those skilled in this art. By virtue of the accurately molded parts, the arc gaps may be established by a very simple assembly operation while, at the same time, assuring very accurate dimensioning of these gaps. The configuration of the fibre ring drives the arc terminals away from the edges of the gap and protects the gap spacing from changes as would result from beading, fusing, etc. The gases evolved result in distribution of the arc around the discharge gap and insure its rapid extinguishment within a maximum time of one half cycle of the power current. This time is so short that the surge current does not interfere with the operation of the connected apparatus. The lead or input conductors limit the power follow current to a range which will not be excessive even when the arrester is connected to a high fault current source and, at the same time, these conductors at normal operating temperatures are of sufficiently low resistance that they do not increase materially the protective level of the arrester with the result that the arrester provides adequate protection for the secondary equipment.

While several illustrative embodiments of the present invention have been illustrated and described, it will be apparent to those skilled in this art that numerous changes and modifications can be made and it is, therefore, intended by the appended claims to cover all such modifications as fall within the true spirit and scope of the present invention.

What is claimed as new and desired to be secured by Letters Patent of the United States is:

1. A lightning arrester comprising a cylindrically shaped conducting casing having an open end; at least one lightning arrester unit disposed within said casing; and an insulated conductor formed of a material having a positive temperature coefficient of resistance extending into said open end of said casing for connection to said unit; said unit including a terminal having a sleeve-like portion surrounding said conductor and a head portion electrically connected to the conductor, an insulating tube surrounding said conductor and said sleeve-like portion and extending from said terminal towards said open end of the casing, a conducting cylinder surrounding said insulating sleeve and having formed at its opposed ends first and second outwardly extending annular flanges, the first flange being seated against and electrically connected to said terminal, an insulating member of substantially cylindrical shape having an outer diameter approximately equal to the inner diameter of the casing and also having an axial opening therethrough for receiving said sleeve-like portion of the terminal, a portion of the insulating sleeve and a portion of the conducting cylinder, means defining a cavity in one end of said member for accommodating the head portion of said terminal and for also accommodating said first flange, means defining an annular peripheral recess in the opposite end of said member, a conducting ring-like electrode seated upon said opposite end of said member and in engagement with said second flange, said ring-like electrode having an outer diameter less than the inner diameter of the casing, an annular ring formed of gas evolving material and seated within said recess concentric with said ring-like electrode, a conducting sleeve-like electrode seated against said ring and dimensioned to fit closely within the housing, said sleeve-like electrode being disposed concentric with said ring-like electrode and cooperating with the latter to define a discharge gap, and a perforated insulating plate seated upon said sleeve-like electrode and disposed adjacent said open end of said casing to vent the interior of the casing in order to permit the escape of gases evolved by said ring in the event of breakdown of the discharge gap.

2. A lightning arrester comprising a cylindrically shaped conducting casing; at least one lighting arrester unit disposed within said casing; and a conductor formed of a material having a positive temperature coefficient of resistance extending into one end of said casing for connection to said unit; said unit including a terminal electrically connected to the conductor, an insulating tube surrounding said conductor within the casing and extending from said terminal towards said one end of the casing, a conducting cylinder surrounding said insulating sleeve and having formed at its opposed ends first and second outwardly extending annular flanges, the first flange being seated against and electrically connected to said terminal, an insulating member of substantially cylindrical shape having an outer diameter approximately equal to the inner diameter of the casing and having an axial opening therethrough receiving a portion of the insulating sleeve and a portion of the conducting cylinder, means defining an annular peripheral recess in one end of said member, a conducting ring-like electrode seated upon said member adjacent said recess and in engagement with said second flange, said ring-like electrode having an outer diameter less than the inner diameter of the casing, an annular ring formed of gas evolving material and seated within said recess concentric with said ring-like electrode, a conducting sleeve-like electrode seated against said ring and dimensioned to fit closely within the housing, said sleeve-like electrode being disposed concentric with said ring-like electrode and cooperating with the latter to define a discharge gap, and means for venting the interior of the casing in order to permit the escape of gases evolved by said ring in the event of breakdown of the discharge gap.

3. The lightning arrester of claim 2 wherein the casing houses two lightning arrester units each having the construction specified in claim 2 with the sleeve-like electrodes of both units being electrically connected to the casing and the inner electrodes being electrically connected to conductors respectively extending out of the opposed ends of the casing.

4. The structure defined by claim 2 wherein said conductor is formed of iron.

5. The structure defined by claim 4 wherein said conductor is about six inches in length.

6. The structure defined by claim 3 wherein both of the conductors are formed of iron.

7. The structure defined by claim 6 wherein each of said conductors is about six inches in length.

8. A lightning arrester comprising a cylindrically shaped conducting casing; at least one lightning arrester unit disposed within said casing; and a conductor formed of a material having a positive temperature coefficient of resistance extending into one end of said casing for connection to said unit, said unit including a terminal electrically connected to said conductor within the casing, an insulating member of substantially cylindrical shape having an outer diameter approximately equal to the inner diameter of the casing, said member having an axial opening through which the conductor extends for connection to said terminal, a ring-like electrode seated upon said member and having an outer diameter less than the inner diameter of the casing, means electrically connecting said ring-like electrode with said terminal, a ring formed of gas evolving material and seated within said recess concentric with but spaced from said ring-like electrode, a conducting sleeve-like electrode seated against said ring in a position concentric with said ring-like electrode to form a discharge gap between the electrodes, and means for venting the interior of the casing to permit the escape of gases evolved by said ring in the event of breakdown of the discharge gap.

9. The structure defined by claim 8 wherein said conductor is formed of iron.

10. The structure defined by claim 9 wherein said conductor is about six inches in length.

11. The lightning arrester of claim 8 wherein the casing houses two lightning arrester units each having the construction specified in claim 8 with the ring-like electrodes of both units being electrically connected to the casing and the inner electrodes being electrically connected to conductors respectively extending out of the opposed ends of the casing.

12. The structure defined by claim 11 wherein both of the conductors are formed of iron.

13. The structure defined by claim 12 wherein each of said conductors is about six inches in length.

14. A lightning arrester comprising a cylindrically shaped conducting casing, at least one lightning arrester unit disposed within said casing, and a conductor formed of a material having a positive temperature coefficient of resistance extending into one end of said casing to connect with said lightning arrester unit, an insulating support member disposed within the casing, a conducting circular electrode seated upon said member and having an outer diameter less than the inner diameter of the casing, means electrically connecting the electrode to said conductor within the casing, a ring formed of gas evolving material and disposed around but spaced from said electrode, means cooperating with said electrode to define a discharge gap to conduct surge current from the electrode to the housing, and means for venting the interior of the casing including said discharge gap to permit the escape of gases evolved by said ring upon breakdown of the discharge gap.

15. The structure defined by claim 14 wherein said conductor is formed of iron.

16. The structure defined by claim 15 wherein said conductor is about six inches in length.

17. The lightning arrester of claim 14 wherein the casing houses two lightning arrester units each having the construction specified in claim 14 with [the sleeve-like electrodes of both units being electrically connected to the casing and] the [inner] *circular* electrodes being electrically connected to conductors respectively extending out of the opposed ends of the casing.

18. The structure defined by claim 17 wherein both of said conductors are formed of iron.

19. The structure defined by claim 18 wherein each of said conductors is about six inches in length.

*20. A lightning arrester comprising a cylindrically shaped conducting casing, at least one lightning arrester unit disposed within said casing, and including, an insulating support member disposed within the casing, a conducting circular electrode seated upon said member and having an outer diameter less than the inner diameter of the casing, a ring formed of gas evolving material and disposed around but spaced from said electrode, means cooperating with said electrode to define a discharge gap to conduct surge current from the electrode to the casing; means for venting the interior of the casing including said discharge gap to permit the escape of gases evolved by said ring upon breakdown of the discharge gap and a conductor formed of a material having a positive temperature of coefficient of resistance electrically connected with said lightning arrester unit.*

*21. A lightning arrester comprising a cylindrically shaped conducting casing, at least one lightning arrester unit disposed with said casing and including, an insulating support member disposed within the casing, a conduct-*

*ing circular electrode seated upon said member and having an outer diameter less than the inner diameter of the casing, a discharged gap defined between said electrode and said casing for conducting surge current from the electrode to the housing, a ring formed of gas evolving material and disposed around but spaced from said electrode means for venting the interior of the casing including said discharge gap to permit the escape of gases evolved by said ring upon breakdown of the discharge gap and a conductor formed of a material having a positive temperature of coefficient of resistance electrically connected with said lightning arrester unit.*

*22. A lightning arrester comprising casing means including a cylindrically shaped conducting electrode, a conducting circular electrode having a discharge surface spaced from the first mentioned electrode and having an outer diameter less than the inner diameter of said first mentioned electrode, a discharge gap defined between said electrodes to conduct surge current, gas evolving material disposed in said gap, a conductor formed of a material having a very high positive temperature coefficient of resistance electrically connected to one of said electrodes having a rise in resistivity between 20° C. and 500° C. of approximately five times the initial resistance to form a current limiting resistance of approximately 0.1 ohm at opproximately 500° C., and means for venting said discharge gap to permit the escape of gases evolved by said gas evolving material upon breakdown of said discharge gap.*

References Cited by the Examiner

The following references, cited by the Examiner, are of record in the patented file of this patent or the original patent.

UNITED STATES PATENTS

| | | | |
|---|---|---|---|
| 2,010,018 | 8/35 | Hodnette | 315—46 |
| 2,385,663 | 9/45 | Wade | 313—231.1 X |
| 2,628,322 | 2/53 | Yonkers | 313—231.1 |

DAVID J. GALVIN, *Primary Examiner.*

JAMES D. KALLAM, *Examiner.*